United States Patent Office 2,717,252
Patented Sept. 6, 1955

---

2,717,252

PREPARATION OF METHIONINE HYDANTOIN

David Oliver Holland, Dorking, England, assignor to Beecham Research Laboratories Limited, Betchworth, England, a company of Great Britain No Drawing. Application December 15, 1952,
Serial No. 326,168

Claims priority, application Great Britain
December 21, 1951

10 Claims. (Cl. 260—309.5)

This invention is an improved process for the preparation of methionine hydantoin (5-$\beta$-methylthioethylhydantoin) from methionine nitrile ($\alpha$-amino-$\gamma$-methylthiobutyronitrile).

The reaction of methionine nitrile with carbon dioxide at ordinary temperature in the absence of an auxiliary agent or catalyst is very slow and yields methionine hydantoin as a minor product only. This method has been described by Bucherer and Steiner in J. Prakt. Chem., vol. 140, pp. 291–316 (1934). The object of the present invention is to improve this reaction so that good yields of methionine hydantoin will be obtainable.

According to the invention methionine nitrile is reacted with carbon dioxide in the presence of an amine of basicity substantially greater than the nitrile. The amine is preferably used in the proportion of at least one mole of amine per mole of the nitrile.

The amine may be primary, secondary or tertiary and is preferably of the lower aliphatic series comprising alkylamines, alkanolamines and alkylalkanolamines. The preferred amine is triethylamine.

Methionine hydantoin may be hydrolysed to give methionine which is well known to be a vital factor in human and animal nutrition. Methionine has also a valuable therapeutic action in the case, for example, of certain liver diseases.

The invention is illustrated in the following example:

Carbon dioxide was bubbled for one hour through a solution of 6.5 g. (0.05 mole) of pure methionine nitrile in 50 ml. of 50% aqueous alcohol to which 0.05 mole of triethylamine had been added. After standing overnight (or for some hours) at ordinary temperature the mixture was concentrated under reduced pressure to remove alcohol and made strongly acid with concentrated hydrochloric acid, whereupon the hydantoin separated. After standing in a refrigerator for some hours the hydantoin was collected and washed with a little cold water, the filtrate and washings being concentrated to yield a second crop of the hydantoin. The yield of hydantoin was 90% of the theoretical. When, instead of triethylamine, the equivalent amount (0.05 mole) of trimethylamine or $\beta$-diethylaminoethanol was used, slightly lower (about 80%) yields of the hydantoin were obtained. A yield of about 73% was obtained with diethylamine, whilst with tri-n-butylamine, triethanolamine, diethanolamine and isopropylamine, the yields ranged between about 40% and 50%. In the case of tri-n-butylamine being used the carbon dioxide was passed in for 3 hours until the initially insoluble amine had almost entirely dissolved.

By contrast, substantially no yield was obtained with the very weak base tribenzylamine, of which very little dissolved, or with ammonia.

The hydantoin can be hydrolysed to methionine in high yield by the use of alkaline hydrolysing agents. For the preparation of methionine in this way it is not necessary, however, to isolate the hydantoin. After the reaction with carbon dioxide is complete the mixture can be treated with the alkaline hydrolysing agent, the alcohol and the amine recovered and the hydrolysis can then be carried out in any desired manner. The recovery of amine is very high and it can be used in the alcohol also recovered for further reaction.

I claim:

1. Process for preparing methionine hydantoin by reacting methionine nitrile with carbon dioxide in the presence of an amine of basicity substantially greater than the nitrile.

2. Process as claimed in claim 1 in which the carbon dioxide is passed through an aqueous alcoholic solution of the nitrile and amine.

3. Process according to claim 1 in which the amine is a lower alkylamine.

4. Process according to claim 1 in which the amine is of the group consisting of triethylamine, trimethylamine and diethylamine.

5. Process according to claim 1 in which the amine is an alkanolamine.

6. Process according to claim 1 in which the amine is an alkylalkanolamine.

7. Process according to claim 1 in which the amine is $\beta$-diethylaminoethanol.

8. Process according to claim 1 in which there is used at least one mole of the amine per mole of the nitrile.

9. Process for preparing methionine hydantoin by passing carbon dioxide through an aqueous alcoholic solution of methionine nitrile and triethylamine.

10. Process according to claim 9 in which at least one mole of triethylamine per mole of methionine nitrile is used.

References Cited in the file of this patent

UNITED STATES PATENTS

| | | |
|---|---|---|
| 2,409,754 | Henze | Oct. 22, 1946 |
| 2,557,913 | Livak et al. | June 19, 1951 |
| 2,642,459 | White | June 16, 1953 |

OTHER REFERENCES

Ware, Chem. Reviews, vol. 46, pp. 422–25 (1950).
Bucherer et al., J. Prakt. Chem., vol. 140, pp. 291–316 (1934).